(12) United States Patent
Tzeng et al.

(10) Patent No.: US 8,103,800 B2
(45) Date of Patent: Jan. 24, 2012

(54) METHOD AND APPARATUS FOR MULTI-CHIP ADDRESS RESOLUTION LOOKUP SYNCHRONIZATION IN A NETWORK ENVIRONMENT

(75) Inventors: Shrjie Tzeng, Fremont, CA (US); Chiung-Chi Lin, Tainan (TW)

(73) Assignee: Broadcom Corporation, Irvine, CA (US)

( * ) Notice: Subject to any disclaimer, the term of this patent is extended or adjusted under 35 U.S.C. 154(b) by 1362 days.

(21) Appl. No.: 10/780,853

(22) Filed: Feb. 19, 2004

(65) Prior Publication Data

US 2005/0021846 A1 Jan. 27, 2005

Related U.S. Application Data

(60) Provisional application No. 60/482,520, filed on Jun. 26, 2003.

(51) Int. Cl.
*G06F 15/16* (2006.01)
*G06F 15/173* (2006.01)
*H04L 12/28* (2006.01)

(52) U.S. Cl. ........ 709/250; 709/206; 709/242; 709/251; 370/254; 370/258; 370/351

(58) Field of Classification Search ............. 370/351, 370/386–389, 222, 254–258; 709/204–206, 709/238–242, 251
See application file for complete search history.

(56) References Cited

U.S. PATENT DOCUMENTS

| | | | |
|---|---|---|---|
| 5,414,704 A | 5/1995 | Spinney | |
| 5,524,254 A | 6/1996 | Morgan et al. | |
| 5,781,549 A | 7/1998 | Dai | |
| 5,825,772 A | 10/1998 | Dobbins et al. | |
| 5,898,687 A | 4/1999 | Harriman et al. | |
| 5,918,074 A | 6/1999 | Wright et al. | |
| 6,011,795 A | 1/2000 | Varghese et al. | |
| 6,094,434 A * | 7/2000 | Kotzur et al. | 370/401 |
| 6,111,874 A * | 8/2000 | Kerstein | 370/389 |
| 6,430,188 B1 * | 8/2002 | Kadambi et al. | 370/398 |
| 6,466,985 B1 * | 10/2002 | Goyal et al. | 709/238 |
| 6,560,229 B1 * | 5/2003 | Kadambi et al. | 370/392 |
| 6,621,818 B1 * | 9/2003 | Szczepanek et al. | 370/389 |
| 6,690,668 B1 * | 2/2004 | Szczepanek et al. | 370/392 |
| 6,751,189 B1 * | 6/2004 | Gullicksen et al. | 370/216 |

(Continued)

FOREIGN PATENT DOCUMENTS

WO 99/00944 1/1999

*Primary Examiner* — Joshua Joo

(57) ABSTRACT

A method of handling datagrams in a network device coupled to other network devices is disclosed. The method includes the steps of receiving an incoming datagram at a port of the network device, determining an egress port for the incoming datagram based on a destination address contained in the incoming datagram and a lookup of an address resolution lookup (ARL) table and performing a lookup of the ARL table based on a source address contained in the incoming datagram to determine whether the source address has been learned previously. The method also includes the steps of writing an entry into the ARL table when the source address has not been learned previously, determining whether the other network devices have learned the source address when the source address has been learned previously and continuing to relay a learning message with the source address to the other network devices when it is determined that the other network devices have not learned the source address.

18 Claims, 4 Drawing Sheets

U.S. PATENT DOCUMENTS

| | | | |
|---|---|---|---|
| 6,999,455 B2 * | 2/2006 | Sampath et al. | 370/392 |
| 7,283,476 B2 * | 10/2007 | Bare | 370/236 |
| 2002/0018481 A1 * | 2/2002 | Mor et al. | 370/403 |
| 2002/0037006 A1 * | 3/2002 | Sampath et al. | 370/389 |
| 2003/0169734 A1 * | 9/2003 | Lu et al. | 370/386 |
| 2003/0179707 A1 * | 9/2003 | Bare | 370/235 |
| 2004/0190461 A1 * | 9/2004 | Gullicksen et al. | 370/258 |

* cited by examiner

METHOD AND APPARATUS FOR MULTI-CHIP ADDRESS RESOLUTION LOOKUP SYNCHRONIZATION IN A NETWORK ENVIRONMENT

REFERENCE TO RELATED APPLICATIONS

This application claims priority of U.S. Provisional Patent Application Ser. No. 60/482,520, filed on Jun. 26, 2003. The subject matter of this earlier filed application is hereby incorporated by reference.

BACKGROUND OF THE INVENTION

1. Field of Invention

The present invention relates to devices, software applications and networks that utilize data that is sent or received over data communication or computer networks. In particular, the present invention is directed to processes that allow for destinations of datagrams forwarded through the computer network to be synchronized between network devices. The network devices and methods described provide for a scheme that allows for all of the linked network devices to receive updated destination data for the datagrams.

2. Description of Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology.

Based upon the Open Systems Interconnect (OSI) 7-layer reference model, network capabilities have grown through the development of repeaters, bridges, routers, and, switches, which operate with various types of communication media. Collectively, with respect to the present invention, all of these may be referred to as network devices. Switches, as they relate to computer networking and to Ethernet, are hardware-based devices which control the flow of datagrams, data packets or cells based upon destination address information which is available in each packet. A properly designed and implemented switch should be capable of receiving a packet and switching the packet to an appropriate output port at the maximum speed capability of the particular network.

Referring to the OSI 7-layer reference model discussed previously, the higher layers typically have more information. Various types of products are available for performing switching-related functions at various levels of the OSI model. Hubs or repeaters operate at layer 1, and essentially copy and "broadcast" incoming data to a plurality of spokes of the hub. Layer 2 switching-related devices are typically referred to as multiport bridges, and are capable of bridging two separate networks. Bridges can create a table of forwarding rules based upon which MAC (media access controller) addresses exist on which ports of the bridge, and pass packets that are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer 3 switches, sometimes referred to as routers, can forward packets based upon the destination network address. Layer 3 switches are capable of learning addresses and maintaining tables thereof which correspond to port mappings. Processing speed for layer 3 switches can be improved by utilizing specialized high performance hardware, and off loading the host CPU so that instruction decisions do not delay packet forwarding.

In addition, there has also been pressure from the implementers of the computer networks to have network devices to mediate traffic on the computer networks that are flexible and able to provide the needed capacity through the combination of multiple network devices. For example, a network device having eight ports may be linked with one or more similar network devices to provide the capacity of the multiple ports of the linked devices. While the combination of multiple network devices may be ideal in meeting capacity requirements, but the combination of the network devices also results in other issues. One such issue is that each network device has its own means for determining the destination port for a received datagram and those means must be synchronized to provide efficient operation. While the prior art network devices and methods provide many of these attributes, there is a need for a network devices that may be used together to provide the capacity needed by the implementers and provide efficiency in handling of datagrams.

SUMMARY OF THE INVENTION

The present invention is directed to a network device and methods that allow for datagrams to be efficiently forwarded through the computer network through the use of multiple network devices connected together. The processor and methods described provide for a scheme that allows for synchronization of Address Resolution Logic (ARL) tables, where those tables are used to determine an egress port for the datagrams, that does not require extra bandwidth or memory buffer allocation. The invention is directed to many types of data networks carrying various forms of datagrams. Specific embodiments of the invention may be directed to the handling of packets in an Internet Protocol network.

According to one embodiment of the invention, a method of handling datagrams in a network device coupled to other network devices is disclosed. The method includes the steps of receiving an incoming datagram at a port of the network device, determining an egress port for the incoming datagram based on a destination address contained in the incoming datagram and a lookup of an address resolution lookup (ARL) table and performing a lookup of the ARL table based on a source address contained in the incoming datagram to determine whether the source address has been learned previously. The method also includes the steps of writing an entry into the ARL table when the source address has not been learned previously, determining whether the other network devices have learned the source address when the source address has been learned previously and continuing to relay a learning message with the source address to the other network devices when it is determined that the other network devices have not learned the source address.

Additionally, the method may include updating a hit bit in the ARL table when the source address has been learned previously. Also, the step of determining whether the other network devices have learned the source address may include examining a learned all devices tag for the source address in the ARL table. Also, the same method steps carried out by the network device may also be carried out by the other network devices.

In addition, the network device and the other network devices may be connected through a ringed connection and the step of continuing to relay a learning message may include continuing to relay a learning message through the ringed connection. Also, the step of determining an egress port may include flooding all ports of the network device with the incoming datagram when the lookup of the ARL table does not find a match with the destination address. Additionally, the step of receiving an incoming datagram may include receiving an incoming data packet.

According to another embodiment, a network device coupled to other network devices for handling datagrams is disclosed. The network device includes a plurality of ports for receiving an incoming datagram, an address resolution lookup (ARL) table, means for determining an egress port for the incoming datagram based on a destination address contained in the incoming datagram and lookup means for performing a lookup of the ARL table based on a source address contained in the incoming datagram to determine whether the source address has been learned previously. The network device also includes writing means for writing an entry into the ARL table when the source address has not been learned previously, determining means for determining whether the other network devices have learned the source address when the source address has been learned previously and relaying means for relaying a learning message with the source address to the other network devices when it is determined that the other network devices have not learned the source address.

According to another embodiment, a network device coupled to other network devices for handling datagrams is disclosed. The network device includes a plurality of ports for receiving an incoming datagram, an address resolution lookup (ARL) table, an egress port determiner for determining an egress port for the incoming datagram based on a destination address contained in the incoming datagram, an ARL table reader for performing a lookup of the ARL table based on a source address contained in the incoming datagram to determine whether the source address has been learned previously, an ARL table writer for writing an entry into the ARL table when the source address has not been learned previously, a global address determiner for determining whether the other network devices have learned the source address when the source address has been learned previously and a learning message forwarder for relaying a learning message with the source address to the other network devices when it is determined that the other network devices have not learned the source address.

These and other variations of the present invention will be described in or be apparent from the following description of the preferred embodiments.

BRIEF DESCRIPTION OF THE DRAWINGS

For the present invention to be easily understood and readily practiced, the present invention will now be described, for purposes of illustration and not limitation, in conjunction with the following figures.

DETAILED DESCRIPTION OF PREFERRED EMBODIMENTS

Figure 1:
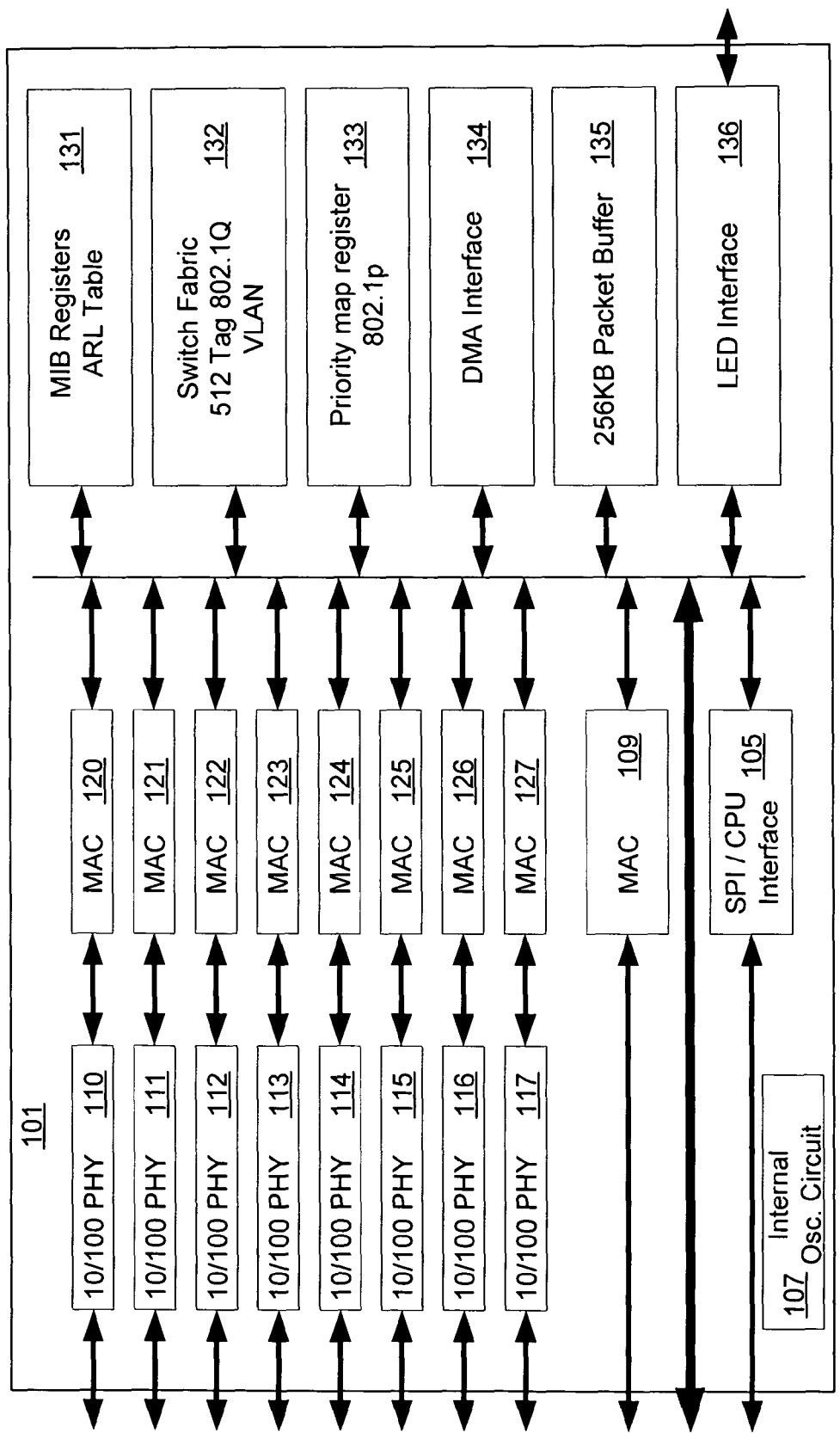
FIG. 1 illustrates a block diagram providing the basic elements of a network device, according to one embodiment of the present invention.

The present invention is directed to a network device that receives data and processes that data and may forward that data onto a destination based on attributes of that data. A general schematic of one such network device 101, according to one embodiment of the present invention, is illustrated in FIG. 1. This device integrates eight 10/100BASE-TX transceivers 110-117, one general use (10/100BASE-TX/FX) MII, nine full-duplex capable Media Access Controllers (MACs) 120-127 and 109, a Serial Management Port 105, high-performance integrated packet buffer memory 135, an address resolution engine, a non-blocking switch controller, and a set of Management Information Base (MIB) statistics registers 131.

The device can also include a module for determining the Virtual Local Area Network (VLAN) identifier for received packets 132, as well as a module for determining Class-of-Service (CoS) of the same 133. The network device complies with the IEEE 802.3, 802.3u and 802.3x specifications, including the MAC control PAUSE frame and auto-negotiation subsections, providing compatibility with all industry-standard Ethernet and Fast Ethernet devices. The network device also can include a Direct Memory Access (DMA) interface module 134 and a light emitting diode (LED) interface 136.

The integrated 10/100BASE-TX transceivers perform all the physical layer interface functions for 100BASE-TX full-duplex or half-duplex Ethernet on, for example, CAT 5 twisted pair cable and 10BASE-T full- or half-duplex Ethernet on CAT 3, 4, or 5 cable. The device provides nine internal media access controllers. Each MAC is dual-speed and both half- and full-duplex capable. Flow control is provided in the half-duplex mode with backpressure.

An integrated address management engine provides address learning and recognition functions at maximum frame rates. The address table provides capacity for up to 4K unicast and multicast addresses. Addresses are added to the table after receiving an error-free packet. Broadcast and multicast frames are forwarded to all ports within the VLAN domain except the port where it was received. The network devices may be cascaded to 36 ports through 3.2 Gbps expansion ports or stacked to 48 ports with 200 Mbps turbo MII ports.

Address learning is one of the key features in the design of network devices. When a frame is received at a network device, the receiving port will use the destination address to determine which destination port the frame should be forwarded to. If the destination address lookup produces a match, the receiving port will be able to know which port or ports this frame is destined for. The receiving port will then relay the frame only to the destination port or ports. If the destination address lookup fails, the receiving port cannot find to which port or ports the frame is destined. The receiving port will then relay the frame to all ports. (This is called flooding the frame.)

After the destination address lookup, the receiving port will also perform a source address lookup. This procedure is performed so that the network device can learn the port/MAC address mapping relationship. If the source address lookup fails, that implies that the source address has not yet been learned. The receiving port will then update the Address Resolution Lookup (ARL) table with this source address and receiving port number. Therefore, later on, if another port receives a frame with a destination address equal to this source address, the other port will know the destination port. If the source address lookup produces a match, the receiving port will update the hit bit of that entry. The hit bit is used for aging purposes and is not discussed in detail herein. After the source address is learned, the receiving port will send a frame to the other linked network devices, so that other network devices can also learn this MAC address.

Figure 2:
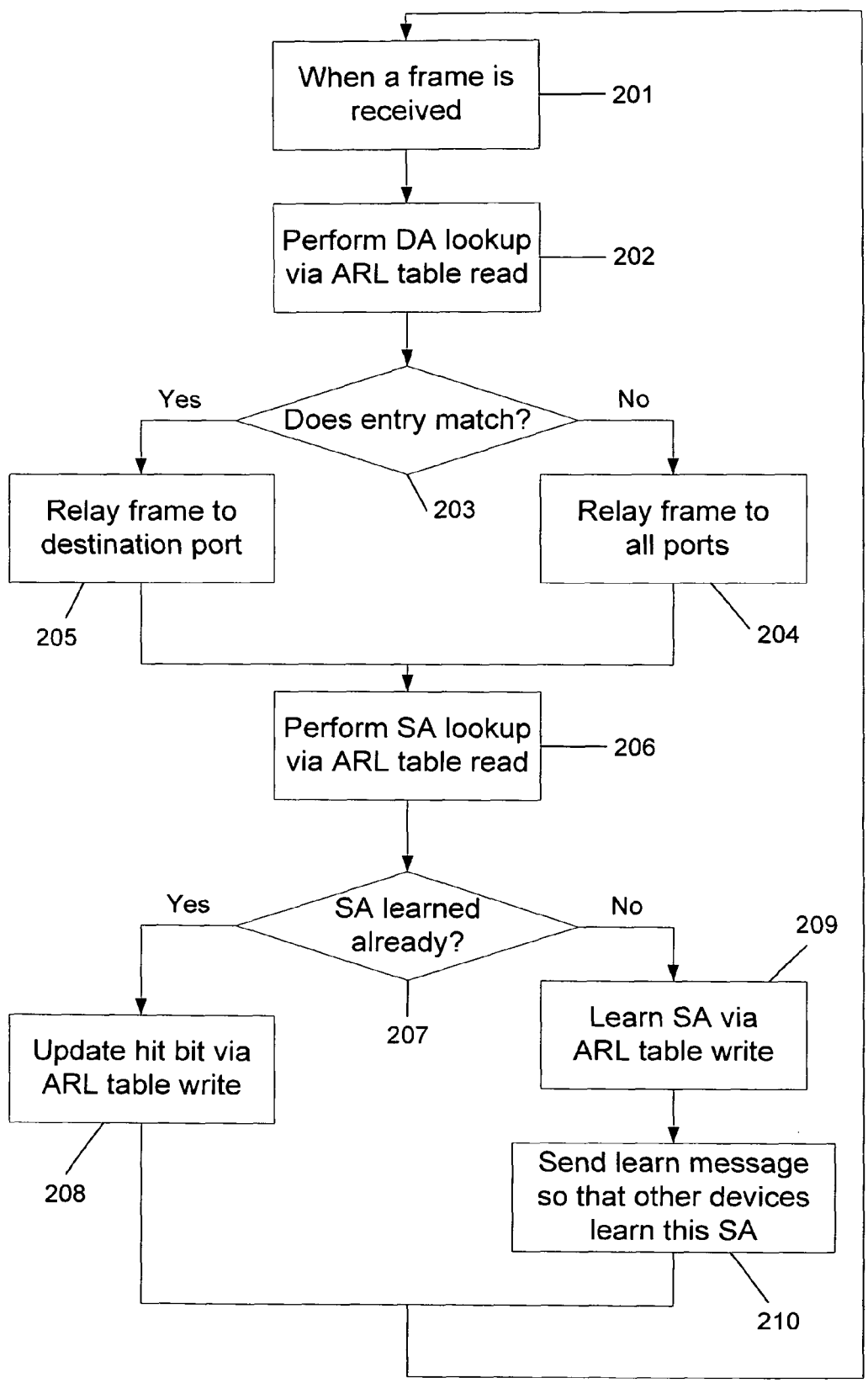
FIG. 2 illustrates a flow chart showing the process of updating address resolution in connected network devices, according to one embodiment of the present invention.

An example of the above-described process is also illustrated in FIG. 2. When a frame is received by the network device (block 201), the destination address contained within the frame is compared with entries in the ARL table for the network device (block 202) to determine if one of the entries can be matched against the destination address (block 203). If a match is found, the frame is relayed to the destination port of the network device corresponding to the destination address obtained from the appropriate entry in the ARL table (block 205). If no match is determined, then the frame is relayed or flooded to all ports of the network device (block 204). Then, a lookup in the ARL table is performed for the source address (block 206) to determine whether the source address has already been learned (block 207). If the source address has been previously learned, then the hit bit is updated for that entry in the ARL table (block 208). If the source address has not already been learned, then an entry is made in the ARL table for the source address (block 209). Additionally, learning messages are sent out so that other network devices connected can also learn the source address (block 210).

One example of the above-described operations is provided herein. At a first time, port 1 receives a frame with a source address equal to MAC_1. If the source address lookup of the port 1 fails, port 1 will update the ARL table indicating that MAC_1 is located at port 1. Additionally, port 1 will send a frame to other linked network devices so that so that the devices learn that MAC_1 is destined for port 1. Subsequently, port 2 receives a frame with a destination address equal to MAC_1, port 2 will perform a destination address lookup. Port 2 will then determine that MAC_1 is located at port 1, as that port was already learned by the ARL table at the earlier time. Thus, port 2 will forward the frame to port 1.

Figure 3:
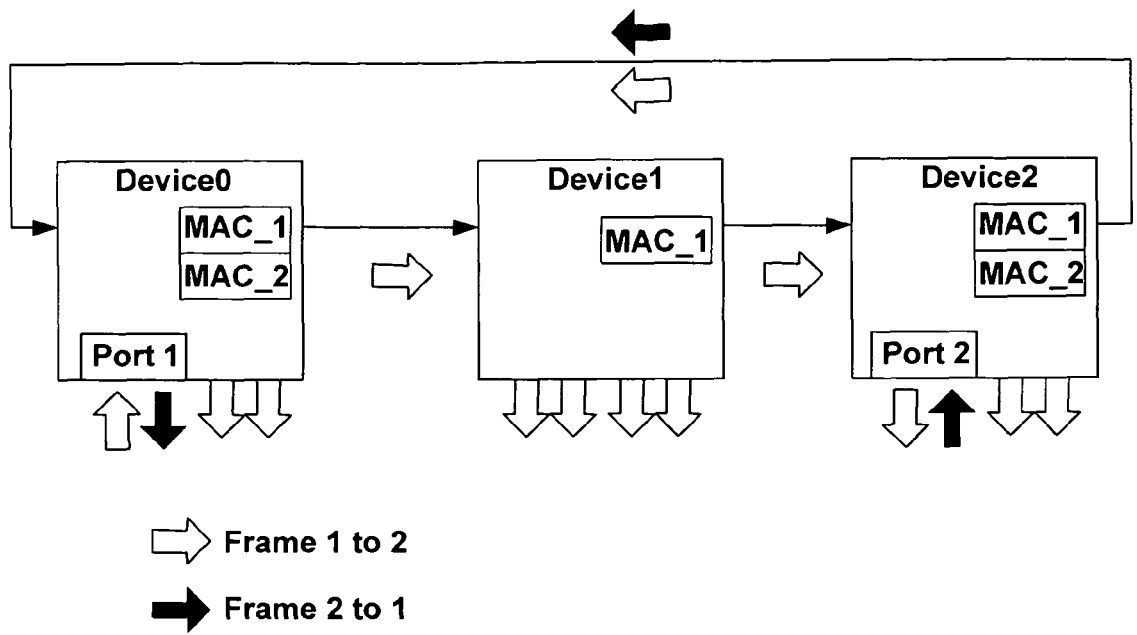
FIG. 3 provides a block diagram illustrating network devices connected together in a ring structure and the learning frames used in the synchronization process, according to one embodiment of the present invention.

When the network devices are connected in a ringed configuration, other issues arise. FIG. 3 illustrates such a series of network devices in a ringed configuration. In the example illustrated, a conversion occurs between port 1 of device 0 and port 2 in device 2. Therefore, port 1 sends a frame with a destination address equal to MAC_2 and a source address equal to MAC_1. Since there is no MAC_1 or MAC_2 in the ARL table in device 0 in the beginning, device 0 will first learn that MAC_1 is at port 1. A frame will be flooded to all ports, as well as the expansion port in device 0. When device 1 receives the frame1to2, it will also learn that MAC_1 is at device 0, port 1. Again, frame1to2 will be flooded and device 2 receives frame1to2 and will learn that MAC_1 is at device 0, port 1. Device 2 will also flood frame 1to2 to all ports.

Thus, at that point, all of the devices have learned that MAC_1 is at device 0, port 1. Then, port 2 at device 2 will communicate with port 1 of device 0. Port 2 sends a frame with a destination address equal to MAC_1 and source address equal to MAC_2. As no MAC_2 entry is in the ARL table for device 2, device 2 will learn MAC_2 resides in port 2 of device 2. Since device 2 has an ARL table entry for MAC_1 already, device 2 knows that a frame2to1 should be relayed to port 1 in device 0. Therefore, it relays frame2to1 through the ring port to device 0.

When device 0 receives frame2to1, because it has a MAC_1 entry in its ARL table already, device 0 will relay frame2to1 to port 1 only. Since there is no frame2to1 going to device 1, device 1 will not have the opportunity to learn MAC_2. Therefore, using data frames alone cannot guarantee synchronization of ARL table entries in a multi-device configuration.

Figure 4:
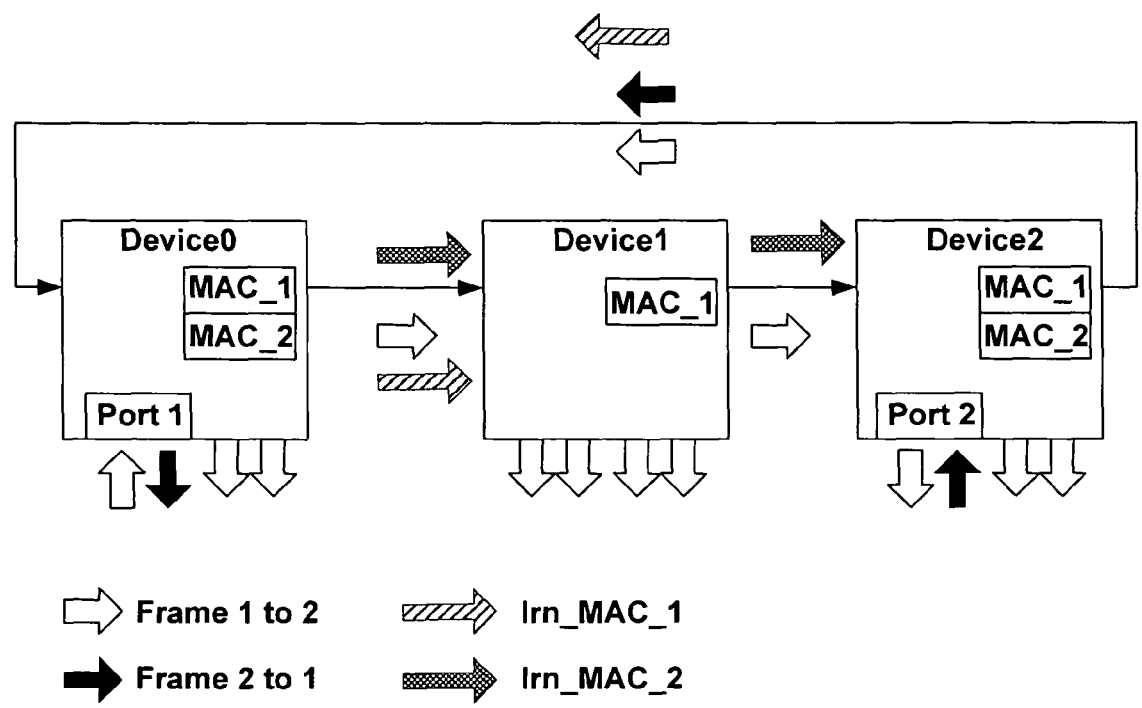
FIG. 4 provides a block diagram illustrating network devices connected together in a ring structure and the improved synchronization process, according to one embodiment of the present invention.

The above issues, regarding the nonsynchronization of the ARL tables, may be resolved through the present invention. One aspect of the present invention is illustrated in FIG. 4. Therein, whenever a new MAC address is learned, the receiving port sends out the learning frame to other devices so that all other devices have a chance to learn the new MAC address, regardless of whether the frame needs to be forwarded to all devices.

In order to keep the ARL tables in the different devices in synchronization, the receiving port sends out a learning message to the other devices whenever the device having the receiving port learns a new MAC address. When receiving a learning message, it is first determined if the corresponding MAC address has already been learned. If it has been previously learned, then the learning message will be relayed to the next device. If it has not been previously learned, the MAC address will be learned first before the learning message is relayed to the next device. One key point needed for this scheme is that no learning messages can be lost, due to overflow or other process. If any one learning message is lost, the ARL tables will not be synchronized and recovery may not be possible.

In some network devices, learning messages are buffered in a FIFO to make sure that no learning messages are lost. The size of the FIFO can be determined by the effective bandwidth for the read/write capability for the ARL interface. Different numbers of ports in each device will result in different worst-case bandwidth requirements. Also, the number of devices cascaded together will result in different worst-case bandwidth requirements as well.

However, the above solution raises several issues. First, the learning message FIFO and control logic associated therewith take up additional silicon in the network device. The cost associated with this extra silicon can be avoided if the learning message FIFO need not be included. Secondly, as discussed above, it can be difficult to calculate the worst-case bandwidth requirement whenever the number of ports in a device or the number of devices cascaded together is changed. The present invention allows for synchronization of ARL tables on multi-device ring system without the drawbacks described above.

Figure 5:
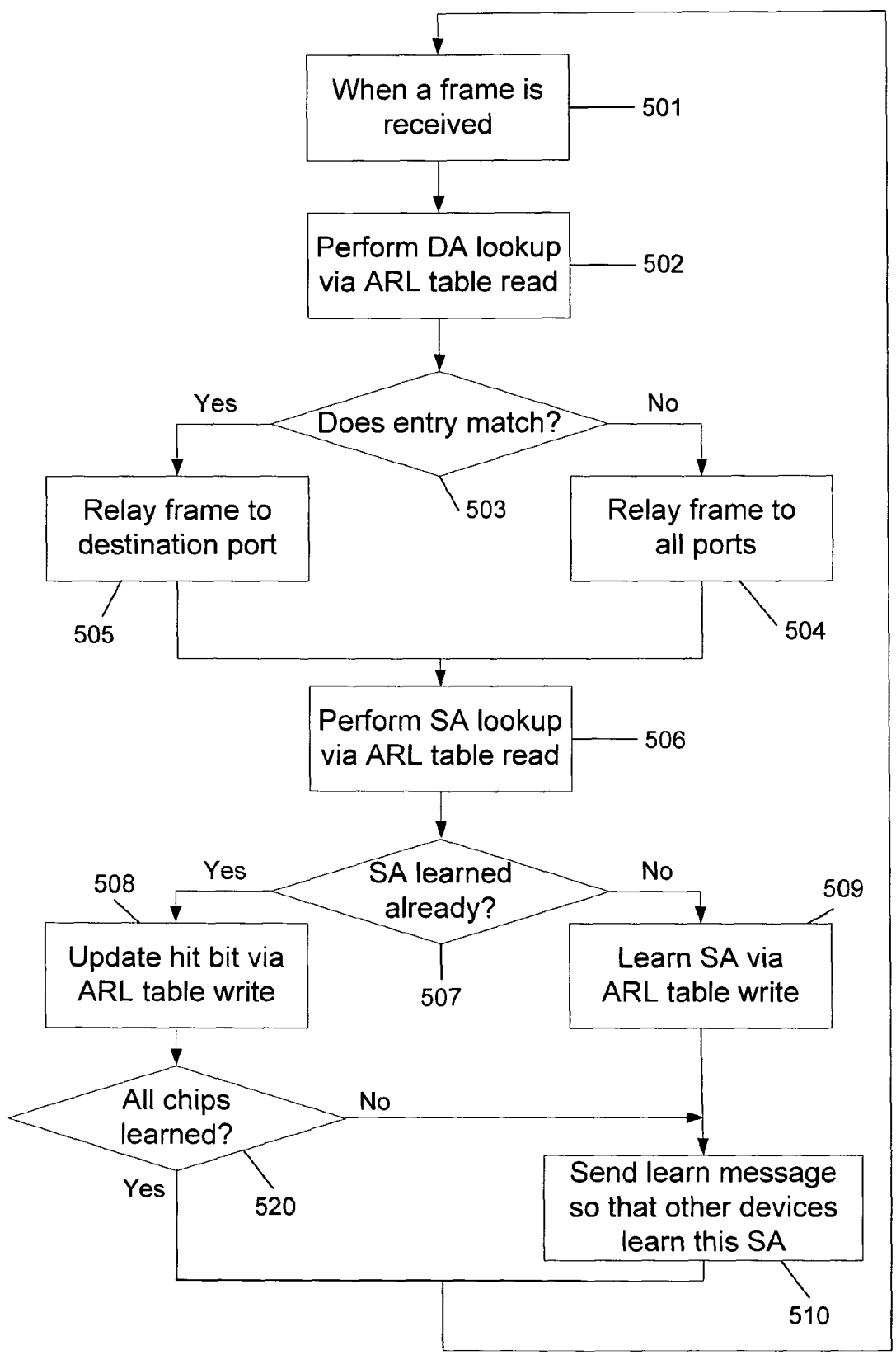
FIG. 5 illustrates a flow chart showing the improved process of updating address resolution in connected network devices, according to one embodiment of the present invention.

The present invention, according to many embodiments, allows for synchronization in ARL tables to be maintained without the need for buffer space to be allocated for learning messages. In order to make sure that each new MAC address is learned by all of the devices that are cascaded together, the port learning procedure is modified. As shown in FIG. 5, the flow chart indicates that learning messages continue to be sent out until all of the linked devices in the ring have learned the corresponding MAC address. Thus, there is no need to allocate buffer space for learning messages to prevent loss of the messages.

All of the linked devices relay learning messages to the next device when the first device is done with the learning message. Therefore, when the corresponding learning message has arrived at the device originating the message, it is understood that the MAC address has been properly learned. Thus, the originating device can stop sending the corresponding learning message.

In part, this can be accomplished by setting a learned-all-devices tag in the ARL table. This tag is used to tell the receiving port logic that the corresponding MAC address has been learned by all connected network devices, and thus, that no learning message need be sent regarding the MAC address. When there are a lot of new MAC address that need to be learned, some of the learning messages may be lost and others may be learned. Only the MAC addresses that have not yet been learned by all devices are re-sent by the corresponding receiving ports.

One example of the above-described process is also illustrated in FIG. 5. When a frame is received by the network device (block 501), the destination address contained within the frame is compared with entries in the ARL table for the network device (block 502) to determine if one of the entries can be matched against the destination address (block 503). If a match is found, the frame is relayed to the destination port of the network device corresponding to the destination address obtained from the appropriate entry in the ARL table (block 505). If no match is determined, then the frame is relayed or flooded to all ports of the network device (block 504). Then, a lookup in the ARL table is performed for the source address (block 506) to determine whether the source address has already been learned (block 507). If the source address has been previously learned, then the hit bit that entry is updated for that entry in the ARL table (block 508). If the source address has not already been learned, then an entry is made in the ARL table for the source address (block 509).

As compared to FIG. 2, the flowchart in FIG. 5 has additional logic such that a determination is made whether all connected network devices have learned the given address (block 520). If all of the connected devices have learned the address, then the flow continues to await the next frame. If all connected network devices have not learned the address, then the learning message continues to be sent (block 510), where learning messages are also sent out after step (block 509) so that other network devices connected can also learn the source address.

To conclude, the prior art methods used to provide synchronization of ARL tables, i.e. increasing bandwidth and providing learning message buffers to prevent a loss in learning messages, have significant drawbacks. Certain embodiments of the present invention provide a cost effective and efficient method to achieve synchronization of ARL tables and also accommodates changes in port configurations.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

In addition, while the terms packet and datagram has been used in the description of the present invention, the invention has import to many types of network data. For purposes of this invention, the term packet includes packet, cell, frame, datagram, bridge protocol data unit packet, packet data and any equivalents thereof.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method of handling datagrams in a network device coupled to other network devices, the method comprising:
performing, by the network device, a lookup of an address resolution lookup ARL table based on a source address contained in an incoming datagram to determine whether the source address has been learned previously;
determining, when the source address has been learned previously, whether the other network devices have learned the source address by examining a learned all devices tag for the source address in the ARL table; and
when it is determined that the other network devices have not learned the source address:
sending, by the network device, a learning message with the source address to the other network devices; and
re-sending, by the network device, the learning message to the other network devices until the learning message is returned to the network device from one of the other network devices.

2. The method of claim 1, wherein the method further comprises updating a hit bit in the ARL table when the source address has been learned previously.

3. The method of claim 1, wherein the network device and the other network devices are connected through a ringed connection and continuing to relay the learning message comprises continuing to relay the learning message through the ringed connection.

4. The method of claim 3, further comprising determining an egress port for the incoming datagram based on a destination address contained in the incoming datagram and a lookup of the ARL table, wherein determining an egress port comprises flooding all ports of the network device with the incoming datagram when the lookup of the ARL table does not find a match with the destination address.

5. The method of claim 1, wherein the incoming datagram comprises an incoming data packet.

6. The method of claim 1, further comprising writing an entry into the ARL table when the source address has not been learned previously.

7. A network device coupled to other network devices for handling datagrams comprising:
a computer readable storage medium having instructions stored thereon, wherein the instructions, when executed by the network device, cause the network device to:
implement an address resolution lookup (ARL) table;
perform a lookup of the ARL table based on a source address contained in an incoming datagram to determine whether the source address has been learned previously;
determine, when the source address has been learned previously, whether the other network devices have learned the source address by examining a learned all devices tag for the source address in the ARL table; and
relay a learning message with the source address from the network device to the other network devices when it is determined that the other network devices have not learned the source address, wherein relaying the learning message comprises repeatedly relaying the learning message from the network device to the other network devices until the learning message is returned to the network device from one of the other network devices.

8. The network device of claim 7, wherein the instructions, when executed by the network device, further cause the network device to update a hit bit in the ARL table when the source address has been learned previously.

9. The network device of claim 7, wherein:
the network device and the other network devices are connected through a ringed connection; and
relaying the learning message comprises relaying the learning message through the ringed connection.

10. The network device of claim 7, wherein the network device is connected to the other network devices through one of a stacking port of the network device and an expansion port of the network device.

11. The network device of claim 7, wherein the instructions, when executed by the network device, further cause the network device to determine an egress port for the incoming datagram based on a destination address contained in the incoming datagram, wherein determining the egress port comprises flooding all ports of the network device with the incoming datagram when the lookup of the ARL table does not find a match with the destination address.

12. The network device of claim 7, wherein the instructions, when executed by the network device, further cause the network device to write an entry into the ARL table when the source address has not been learned previously.

13. A network device coupled to other network devices for handling datagrams comprising:
a computer readable storage medium having instructions stored thereon, wherein the instructions, when executed by the network device, provide for implementing:
an address resolution lookup (ARL) table;
an ARL table reader configured to perform a lookup of the ARL table based on a source address contained in an incoming datagram to determine whether the source address has been learned previously;
a global address determiner configured to determine whether the other network devices have learned the source address when the source address has been learned previously by examining a learned all devices tag for the source address in the ARL table; and
a learning message forwarder configured to relay a learning message with the source address from the network to the other network devices when it is determined that the other network devices have not learned the source address, wherein the learning message forwarder is further configured to repeatedly relay the learning message, from the network device to the other network devices until the learning message is returned to the network device from one of the other network devices.

14. The network device of claim 13, wherein the instructions, when executed by the network device, further provide for implementing an updater configured to update a hit bit in the ARL table when the source address has been learned previously.

15. The network device of claim 13, wherein the network device and the other network devices are connected through a ringed connection and the learning message forwarder comprises a ring message forwarder configured to relay the learning message through the ringed connection.

16. The network device of claim 13, wherein the network device is connected to the other network devices through one of a stacking port of the network device and an expansion port of the network device.

17. The network device of claim 13, wherein the instructions, when executed by the network device, further provide for implementing and egress port determiner configured to determine an egress port for the incoming datagram based on a destination address contained in the incoming datagram, wherein the egress port determiner comprises a port flooder configured to flood all ports of the network device with the incoming datagram when the lookup of the ARL table does not find a match with the destination address.

18. The network device of claim 13, wherein the instructions, when executed by the network device, further provide for implementing an ARL table writer configured to write an entry into the ARL table when the source address has not been learned previously.

* * * * *

UNITED STATES PATENT AND TRADEMARK OFFICE
CERTIFICATE OF CORRECTION

PATENT NO.         : 8,103,800 B2
APPLICATION NO.    : 10/780853
DATED              : January 24, 2012
INVENTOR(S)        : Shrjie Tzeng et al.

It is certified that error appears in the above-identified patent and that said Letters Patent is hereby corrected as shown below:

In column 8, line 15, in claim 1, delete "ARL" and insert -- (ARL) --, therefor.

In column 10, line 28, in claim 17, delete "and" and insert -- an --, therefor.

Signed and Sealed this
Twenty-seventh Day of March, 2012

David J. Kappos
*Director of the United States Patent and Trademark Office*